United States Patent
Shenoi (10) Patent No.: US 10,187,861 B2
(45) Date of Patent: Jan. 22, 2019

(54) CONSTRUCTING A DISTRIBUTED BOUNDARY CLOCK OVER A DEDICATED COMMUNICATION CHANNEL

(71) Applicant: QULSAR, INC., San Jose, CA (US)

(72) Inventor: Kishan Shenoi, Saratoga, CA (US)

(73) Assignee: Qulsar, Inc., San Jose, CA (US)

( * ) Notice: Subject to any disclaimer, the term of this patent is extended or adjusted under 35 U.S.C. 154(b) by 0 days.

(21) Appl. No.: 15/854,362

(22) Filed: Dec. 26, 2017

(65) Prior Publication Data
US 2018/0139709 A1    May 17, 2018

Related U.S. Application Data

(62) Division of application No. 14/885,864, filed on Oct. 16, 2015, now Pat. No. 9,854,548.

(60) Provisional application No. 62/065,599, filed on Oct. 17, 2014.

(51) Int. Cl.
*H04W 56/00* (2009.01)
*H04J 3/06* (2006.01)

(52) U.S. Cl.
CPC .......... *H04W 56/001* (2013.01); *H04J 3/065* (2013.01); *H04J 3/0667* (2013.01); *H04W 56/009* (2013.01); *H04W 56/0035* (2013.01)

(58) Field of Classification Search
None
See application file for complete search history.

(56) References Cited

U.S. PATENT DOCUMENTS

| | | | |
|---|---|---|---|
| 6,259,919 B1 | 7/2001 | Suonvieri | |
| 2010/0158183 A1 | 6/2010 | Hadzic | |
| 2012/0069944 A1* | 3/2012 | Hadzic | H04L 7/033 375/376 |
| 2012/0263220 A1* | 10/2012 | Li | H04W 56/00 375/224 |
| 2013/0077642 A1* | 3/2013 | Webb, III | H03L 7/1974 370/503 |
| 2015/0071309 A1 | 3/2015 | Aweya | |
| 2015/0092793 A1* | 4/2015 | Aweya | H04J 3/0685 370/503 |
| 2016/0095074 A1 | 3/2016 | Bin Sediq | |

* cited by examiner

*Primary Examiner* — Rebecca E Song
(74) *Attorney, Agent, or Firm* — John Bruckner PC (57) ABSTRACT

Implementing a distributed boundary clock in situations where book-end devices such as microwave TX/RX pairs must collaborate in achieving PTP on-path support is described. A dedicated channel, generally low-speed compared to the main channel is used to transfer timing from the master side to the slave side using framing and super-framing applied to the digital channel. Time-stamps of events such as super-frame boundaries are communicated between the two sides to enable timing transfer.

7 Claims, 8 Drawing Sheets

CONSTRUCTING A DISTRIBUTED BOUNDARY CLOCK OVER A DEDICATED COMMUNICATION CHANNEL

CROSS-REFERENCES TO RELATED APPLICATIONS

Referring to the application data sheet filed herewith, this application is a divisional of, and claims a benefit of priority under 35 U.S.C. 120 from co-pending utility patent application U.S. Ser. No. 14/885,864, filed Oct. 16, 2015 (now U.S. Pat. No. 9,854,548, issued Dec. 26, 2017) which in-turn claims a benefit of priority under 35 U.S.C. 119(e) from provisional patent application U.S. Ser. No. 62/065,599, filed Oct. 17, 2014, the entire contents of both of which are hereby expressly incorporated herein by reference for all purposes.

BACKGROUND

Embodiments of the present invention relate generally to time and frequency alignment systems operating over packet-switched communications networks and, more specifically, to methods and apparatus for providing a distributed boundary clock function involving book-end units when there is a dedicated communication channel that is not packet-based between the two book-end units.

Packet-based timing methods are becoming essential for delivering timing over packet-switched networks, often referred to as the cloud. In particular, Precision Timing Protocol (PTP) (aka IEEE™ 1588-2008) is becoming popular for delivering timing information (time/phase/frequency) from a Grand Master (GM) clock to slave clocks in end application-specific equipment. For example, wireless base stations providing mobile telephony services require precise timing and the backhaul method of choice is Ethernet.

The Grand Master clock provides timing information over the packet-switched network to the slave clocks by exchanging packets with embedded time-stamps related to the time-of-arrival and time-of-departure of the timing packets. The slave clock utilizes this information to align its time (and frequency) with the Grand master. The Grand Master is provided an external reference to serve as the basis for time and frequency. Most commonly this reference is derived from a Global Navigation Satellite System (GNSS) such as the GPS System that in turn is controlled by the US Department of Defense and its timing controlled very precisely and linked to the US Naval Observatory. Time alignment to the GPS clock is, for all practical purposes equivalent to time alignment to UTC.

The communication path between the GM and the end-point slave unit may involve multiple switches and transmission links. Since packet-switching is statistical in nature, the transit delay of packets between GM and end-point slave is not constant, a phenomenon referred to as transit delay variation (TDV) or packet delay variation (PDV). This PDV acts like an additive noise to the timing signal and must be filtered out by the slave clock recovery algorithm. In order to allow for precise synchronization, IEEE 1588 proposes the notion of on-path timing support. The notion of full on-path support is when each and every switch between the GM and the end-point switch provides on-path support. On-path support in this scenario is achieved by boundary clocks (BCs) and transparent clocks (TCs). Full on-path support implies that every switch between the master and slave is either a boundary clock or a transparent clock. Note that for this description the terms switch and router are equivalent.

The transparent clock function represents the attempt by the switch to remove any transit delay variation introduced by the switch itself. The PTP packet structure provides "correction fields" that are updated by each TC to reflect the delay of that packet through the switch. This makes the switch nominally transparent to the timing packet flow from the viewpoint of timing noise or PDV.

A boundary clock performs a clock regeneration function. A boundary clock includes a slave side that "looks" towards the GM to develop a local clock that is synchronized to the GM. It has a master side that looks towards the end-point slave and performs a PTP master function using the clock recovered by the slave side as its reference for time.

The notion of partial on-path support is when not all the intermediate elements are PTP aware. The PTP-aware elements in this case are generally boundary clocks.

There are some situations where the link between two network elements is not packet based. One example of such a situation is when microwave radio is used to implement the transmission of Ethernet signals in a "backhaul" application. For example, wireless (telephony) base-stations may expect Ethernet connectivity back into the core telecommunications network but rather than deploy wired communication media, such as fiber, microwave radios are employed. Such radios operate in "book-end" fashion whereby a segment of transmission has two radio TX/RX pairs emulating a direct connection. Such TX/RX pairs have, in addition to the link for Ethernet traffic, a dedicated low-speed communication link between the two that is often called a "wayside channel". This low-speed channel is often an E1 or DS1 channel. For providing on-path support, these two ends of the segment must collaborate to form a distributed boundary clock wherein the slave side of the BC is at one end and the master side of the BC is at the other. This implies that a method for transferring the time/phase of the BC-slave to the BC-master is required.

The invention described here provides a method to transfer timing over the dedicated low-speed link, permitting the two book-ends to collaborate and function as a distributed boundary clock.

SUMMARY

There is a need for the following embodiments of the present disclosure. Of course, the present disclosure is not limited to these embodiments.

According to an embodiment of the present disclosure, a process comprises: synchronizing a first clock located at a receiving side to a second clock located at a sending side including aligning the first clock to the second clock by adjusting the first clock using forward and reverse error estimates $\varepsilon_F(i)$ and $\varepsilon_R(i)$ where $$\varepsilon_F(i) - \Delta_{MS} = -\frac{1}{N} \cdot \sum_{n=0}^{N-1}(T_2(n) - T_1(n))$$

$$\varepsilon_R(i) + \Delta_{SM} = \frac{1}{N} \cdot \sum_{k=0}^{N-1}(T_4(k) - T_3(k))$$

where i is an index that represents an iteration number, each iteration representing N estimates of one-way delay from time-stamps that are averaged to reduce measurement noise, where $\Delta_{MS}$ is forward delay from the second clock to the first clock, where $\Delta_{SM}$ is reverse delay from the first clock to the second clock, where subscripts F and R represent forward and reverse directions, respectively, where $T_1$ is a first time of departure measured according to the second clock, where $T_2$ is a first time of arrival measured according to the first clock, where $T_3$ is a second time of departure measured according to the first clock and where $T_4$ is a second time of arrival measured according to the second clock.

Assuming that the delay is symmetric, i.e., $\Delta_{SM}=\Delta_{MS}$, then an estimate of the time error between the first clock and the second clock is constructed as $$\varepsilon(i) = \frac{\varepsilon_F(i) + \varepsilon_R(i)}{2} = \frac{\frac{1}{N}\sum_{k=0}^{(N-1)}[T_4(k) - T_3(k)] - \frac{1}{N}\sum_{n=0}^{(N-1)}[T_2(n) - T_1(n)]}{2}$$

Figure 7:
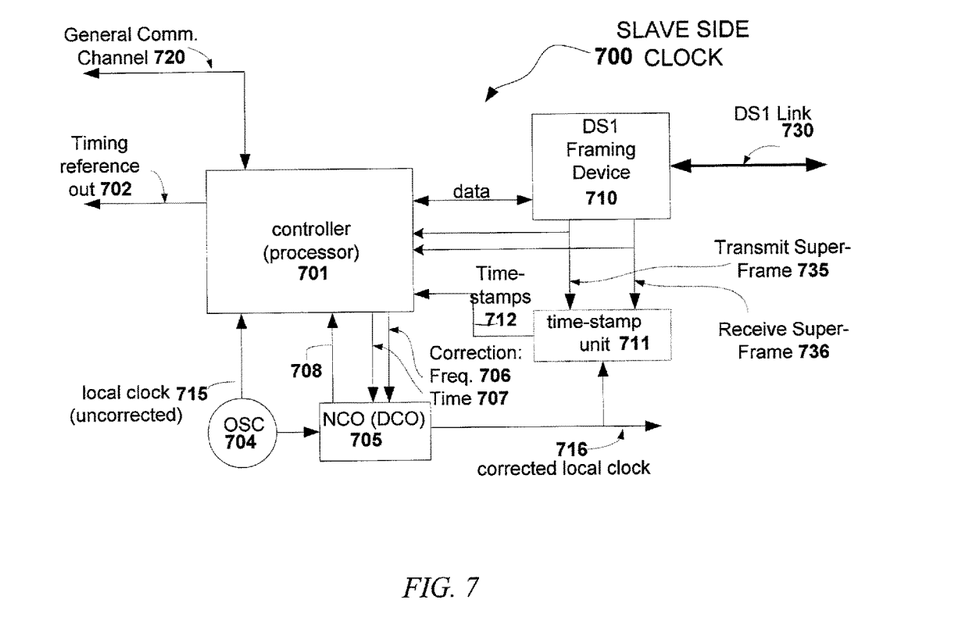
FIG. 7 illustrates the key features and functions of the Slave side clock.

This estimate of time error is used in a conventional Proportional-Integral ("PI") phase-locked-loop arrangement to derive the clock corrections for frequency 706 and time 707 for the numerically controlled oscillator 705. If the controlled oscillator is simply a voltage controlled oscillator (VCO) or digitally controlled oscillator (DCO) then clearly the corrections are combined to generate a single control variable.

According to another embodiment of the present disclosure, a process comprises: synchronizing a first clock located at a receiving side to a second clock located at a sending side including aligning the first clock to the second clock by adjusting a frequency of the first clock using an estimate of a frequency error of the first clock $\delta f_m(i)$ based on change in time error from iteration to iteration where $$\delta f_m(i) = \left(\frac{1}{mT}\right) \cdot (\varepsilon(i) - \varepsilon(i-m))$$

where frequency error estimates are developed over different observation time intervals of mT.

One or more embodiments of the invention provide techniques for delivering a timing reference over a dedicated low-speed channel between book-end devices. The invention is applicable in building distributed boundary clocks in a variety of applications including the use of microwave radio for backhaul of wireless (telephony) traffic from base-stations to the network.

Figure 1:
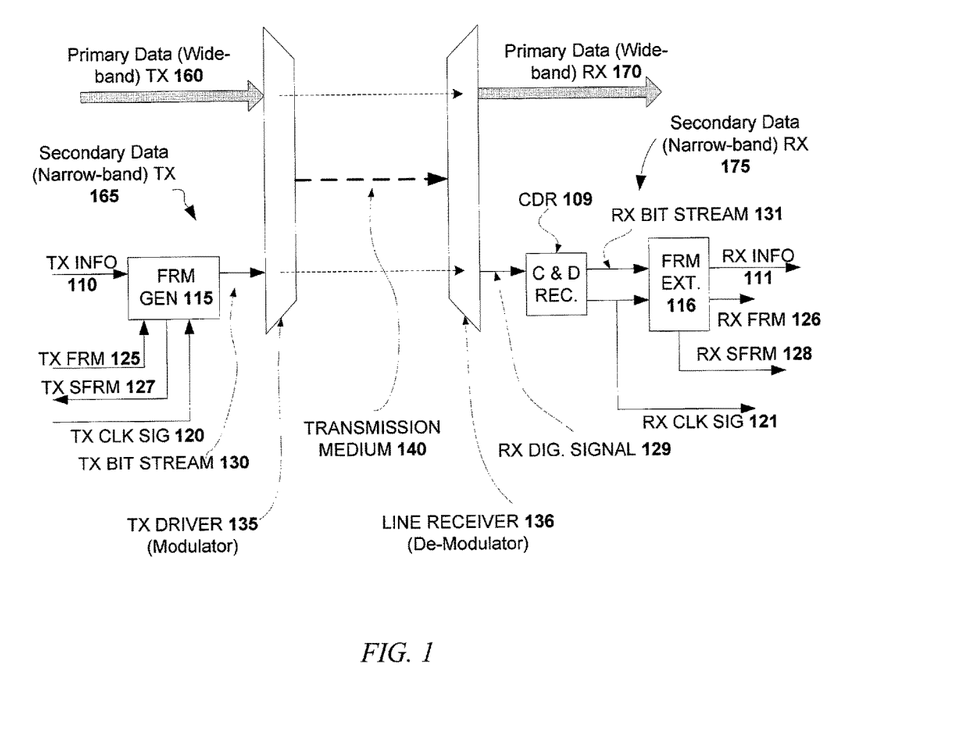
FIG. 1 is a simplified view of underlying scheme for transmitting information over a digital channel showing one direction of transmission. There are two channels, one is the primary wide-band channel and the other is a narrowband channel. The narrowband channel is used to transfer timing from master-side to slave-side over a framed digital channel.
Figure 2:
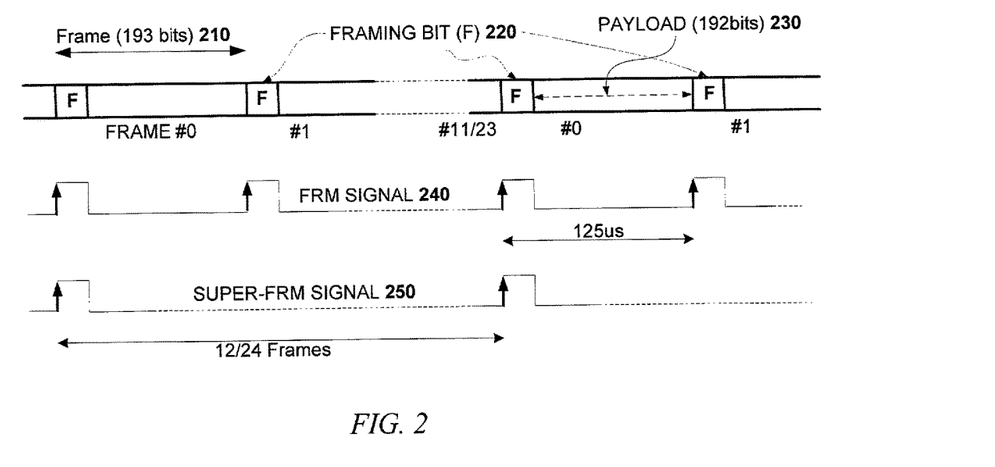
FIG. 2 shows the structure of a serialized bit stream that is framed and super-framed following the DS1 standard.

The common model for a microwave radio link appropriate for this invention is depicted in FIG. 1.

BRIEF DESCRIPTION OF THE DRAWINGS

The drawings accompanying and forming part of this specification are included to depict certain embodiments of the present disclosure. A clearer concept of the embodiments described in this application will be readily apparent by referring to the exemplary, and therefore nonlimiting, embodiments illustrated in the drawings. The described embodiments may be better understood by reference to one or more of these drawings in combination with the following description presented herein. It should be noted that the features illustrated in the drawings are not necessarily drawn to scale.

DETAILED DESCRIPTION

The concept of transmitting information over a digital channel is depicted in FIG. 1. For convenience, only one direction of transmission is shown. The premise is that one side of the link is considered the master and the other side of the link is the slave side and the intent is to synchronize the slave clock to the master clock. For simplicity of explanation it is assumed that the link is a T1 (1.544 Mbps) and is directly point-to-point. Such a direct point-to-point arrangement is very common, especially in microwave transmission systems wherein a secondary or "side-channel" is maintained continuously in parallel with the main or primary (wide-band) channel.

FIG. 1 identifies the two channels of communication. The first is the primary, or wide-band, channel denoted by 160 on the transmit side (TX) and 170 on the receive side (RX). The second is generally a low-speed or narrow-band channel. In digital microwave systems the primary channel generally supports a wide-band stream of several hundred megabits/second. The secondary channel is relatively narrow-band, typically 1.5 to 2 Megabits/second and is often called a "wayside channel". In this invention it is the wayside channel that is used to transfer timing from the "master" to the "slave". Whereas this terminology is conventional, it should be recognized that in a distributed boundary clock scenario the "master" side of timing transfer over the wayside channel is actually the slave side of the distributed PTP boundary clock whereas the slave side of the timing transfer over the wayside channel is the master side of the distributed PTP boundary clock.

As with all serialized digital communication, the information that needs to be transmitted, TX INFO 110, is encapsulated in a frame structure. In keeping with the example of DS1 (1.544 Mbps, also referred to as T1) transmission considered here, the frame structure is developed by considering blocks of 192 bits (24 octets) and prepending a framing bit (usually denoted by "F") thereby making each frame 193 bits in size. This is achieved in the DS1 framing device, FRM GEN 115. The frame rate is 8000 frames per second (i.e. 8 kHz) and consequently the serialized bit stream, TX BIT STREAM 130, has an inherent bit rate of 1.544 Mbps (193×8 kHz). The actual rate of transmission is controlled by the transmit clock signal (TX CLK SIG 120). Most DS1 framing devices permit external control of the framing procedure by accepting a framing signal, TX FRM 125, that is an 8 kHz pulse train that is frequency and phase aligned with the transmit clock signal, TX CLK SIG 120. In other DS1 framing devices the frame structure is developed autonomously and in that case the framing device, FRM GEN 115, provides an output signal equivalent to the transmit framing signal (TX FRM 125). In either case a signal is available that identifies when the start of the frame, namely the framing ("F") bit is present in the signal transmitted, TX BIT STREAM 130.

As is well known, DS1 framing also has a super-frame (SF) structure that permits frames to be identified by a number, modulo-12. That is the framing bit pattern has a period of 12 frames and the frames can be identified as "0", "1", "2", . . . , "11". A second form of super-frame structure utilizes a different scheme that utilizes a 24-frame structure and is known in the literature as "Extended Super Frame" (ESF) and in this case frames can be identified as "0", "1", "2", . . . , "23". DS1 framing devices provide a signal identifying the start of the super frame (either regular or extended super frame).

Of special importance regarding information transfer in FIG. 1 are the following observations:

A. The transmitter side develops the information, typically in octets, 24 octets per DS1 frame. Most framers buffer the information and typically introduce a delay of approximately 1 frame. That is, data presented to the framing device while frame "n" is being delivered in TX BIT STREAM 130 will be delivered in frame "(n+1)". Some framers introduce additional delay so the output may be provided in frame "(n+2)".

B. The transmission medium could be of various forms. One important form is in the case of microwave transmission and a modulator (TX DRIVER 135) encodes the TX BIT STREAM 130 into an RF (radio frequency) signal for transmission over the TRANSMISSION MEDIUM 140. At the receiver a demodulation operation in LINE RECEIVER 136 recreates a replica of the transmit signal. However, because of bandwidth limitations and additive noise in the transmission medium it becomes necessary to extract the received RX BIT STREAM 131 using a clock and data recovery scheme in CDR 109. This is a well known operation and provides not just the bit stream but the associated clock signal RX CLK SIG 121.

C. Nominally, the receive bit stream RX BIT STREAM 131 will be a delayed replica of the transmit bit stream TX BIT STREAM 130. Furthermore, the regenerated clock signal RX CLK SIG 121 will be a (delayed) replica of the transmit clock signal TX CLK SIG 120, albeit with (possibly) some additive clock jitter.

D. The receiver will perform frame synchronization to extract the position of the frame and super-frame in the bit stream and thereby provide signals RX FRM 126 and RX SFRM 128. Nominally RX FRM 126 and RX SFRM 128 are delayed versions of TX FRM 125 and TX SFRM 127 with (possibly) some additive clock jitter. The delay is representative of the transmission delay and processing delay in the path and is, nominally, a constant value.

Two-way time transfer methods can be used to synchronize the clock of one side, referred to as the slave side, to the clock of the other side, referred to as the master side. In particular, the frame (FRM) or super-frame (SFRM) signals can be used to define "events" that can be time-stamped and these time-stamps communicated between the master and slave sides. In the description here we assume that the super-frame signal is employed and, further, the framing scheme is the regular super frame with modulo-12 frame periodicity. The variation for Extended Super Frame (ESF) or any other frame/super-frame format is quite straightforward.

Figure 3:
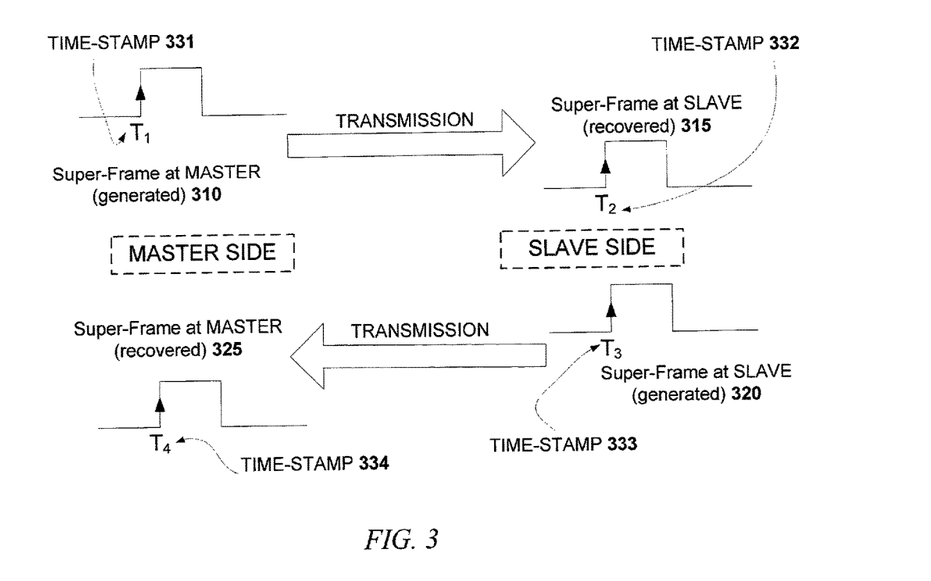
FIG. 3 the exchange of timing events between master and slave side of the dedicated digital channel.

The manner in which the slave clocks align themselves with the master is explained using FIG. 3. The continual exchange of frames between master and slave provide measurements of the transit delay between the two.

The ongoing DS1 super-frame signals (e.g. TX FRM 125 and RX FRM 126) provide suitable event markers corresponding to the generated side and the recovered side. This happens in both directions as indicated in FIG. 3. The Master side time-stamps the generated and recovered super-frame signals and thereby has TIME-STAMP 331 and TIME-STAMP 334; likewise, the Slave side time-stamps the generated and recovered super-frame signals and thereby has TIME-STAMP 332 and TIME-STAMP 333. The terminology "$T_1$", "$T_2$", "$T_3$", "$T_4$", used in FIG. 3 is quite conventional for these time-stamps.

Figure 4:
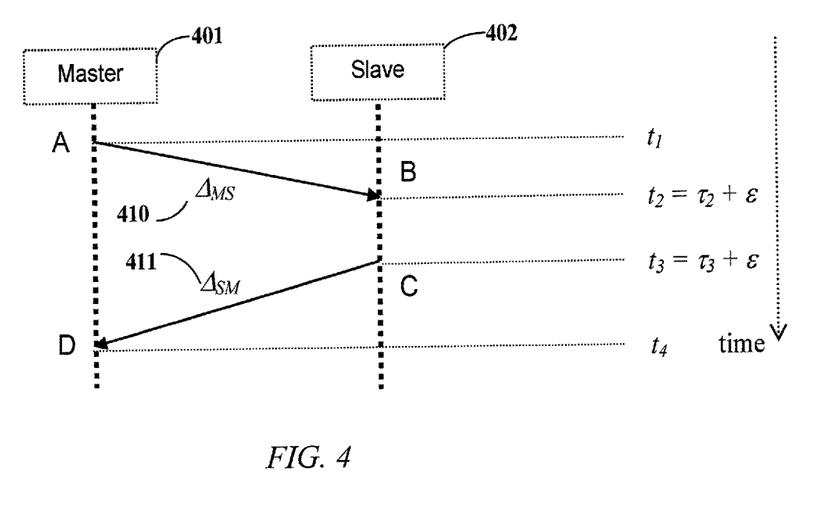
FIG. 4 depicts the exchange of timing information between the master side and slave side of the dedicated digital channel.

The two-way time-transfer principle is explained using FIG. 4.

Referring to FIG. 4, the sequence of events and important items of information associated with an exchange of timing information between master and slave are:

Event A: Super-frame is transmitted by master and time-of-departure ($T_1$) is measured according to the master's clock. Denote this value as $t_1$.

Event B: Super-frame arrives at slave that measures the recovered time-of-arrival ($T_2$) as $\tau_2$ according to the slave clock; assuming that the slave time offset from master (ofm) is $\varepsilon$, the actual time-of-arrival is $t_2=\tau_2+\varepsilon$.

Event C: Super-frame is transmitted by slave that notes the time-of-departure ($T_3$) as $\tau_3$; assuming that the slave time offset from master is $\varepsilon$, the actual time-of-departure is $t_3=\tau_3+\varepsilon$.

Event D: Super-frame arrives at master that measures time-of-arrival ($T_4$) as $t_4$.

From a nomenclature point of view, the 4 time-stamps are referred to as $T_1$, $T_2$, $T_3$, and $T_4$ where $T_1$ and $T_3$ correspond to the time-of-departure of events and $T_2$ and $T_4$ correspond to the time-of-arrival of events (super-frame edges). Such a two-way exchange of time-stamped super-frame events can provide information suitable for allowing the slave to align in time with the master (assuming that both sides have knowledge of the time stamps). If the exchange of information is only one-way, from master to slave (referred to as the forward direction), the slave can still align its clock (frequency) with the master (syntonization) since the packet contains the time-of-departure from the master (t1) and the slave measure the time-of-arrival ($\tau_2$). One-way methods, where the time-stamped events flow from slave to master can be employed provided the mechanism is available for the slave to obtain the results of the master measuring time-of-arrival at the master ($t_4$). Using DS1 channels that are point-to-point, frequency alignment can also be achieved in the slave by using the recovered clock RX CLK SIG 121.

There are four measured values that can be communicated between the master and slave, namely, ($t_1$, $\tau_2$, $\tau_3$, $t_4$). Note that such a two-way exchange involves super-frame transmission in each direction; they do not necessarily have to be consecutive as long as the time-stamp information is communicated appropriately. The pair ($t_1$, $\tau_2$) applies to a super-frame in the master-to-slave direction and the pair ($\tau_3$, $t_4$) applies to a super-frame in the slave to master direction. Note that the difference between the two time values in a pair are the measured transit delays which, because of the clock offset of the slave are incorrect by an amount equal to the time offset. The manner in which these are communicated between the two sides is addressed later. It is not mandatory that time-stamps corresponding to every super-frame be exchanged provided the exchange rate is adequate.

Denoting by $\Delta_{MS}$ and $\Delta_{SM}$ the transit delays between the master and slave and vice versa, the following equations can be established:

$t_4 = \tau_3 + \varepsilon + \Delta_{SM}$ (from an S-to-M super-frame)

$t_1 = \tau_2 + \varepsilon - \Delta_{MS}$ (from a M-to-S super-frame)  (Eq. 1)

In an actual time-transfer situation there are two equations with three unknowns so it is common to assume reciprocity of transit delay between the two devices, thereby reducing the number of unknowns to 2 and therefore computing the slave time offset from master from measurements of the one-way delay as in (Eq. 2) shown below:

$$\varepsilon = \frac{(t_4 + t_1) - (\tau_3 + \tau_2)}{2} = \frac{(t_4 - \tau_3) - (\tau_2 - t_1)}{2} \quad \text{(Eq. 2)}$$

Because of a variety of reasons, the transit delays are not fixed and can vary from super-frame to super-frame. To counter this transit delay variation, as well as to account for any drift in the slave clock oscillator, the estimates of clock offset are made routinely and it is well known that the mitigation of the deleterious effects of transit delay variation and oscillator drift is improved by using more frequent exchanges of time-stamped timing events. Ordinary slaves 402 develop their estimate of time offset from master 401 based on (Eq. 2).

It is imperative that the two sides communicate time-stamps to each other in an orderly manner. In particular, when the master/slave transmits the time-stamp of the generated super-frame to the slave/master it is essential that the receiving side associate the time-stamp with the correct recovered super-frame. Since the receiving side returns the recovered super-frame time-stamp back to the sending side, the super-frame identity must be preserved. This is simply done by assigning a sequence number to each super-frame. For example, an 8-bit number (between 0 and 255, inclusive) can be associated with each super-frame that is time-stamped. The range of numbers should be large enough that when the number rolls over (0 comes after 255) it is straightforward to detect and does not result in any ambiguity.

The resolution of the time-stamp must be adequate to represent the time values of interest with a fine enough granularity. It is recommended that an existing standard for time-stamps be utilized. In particular, the time-stamp format specified in IEEE 1588TM-2008 (IEEE Standard covering Precision Time Protocol or PTP) is a suitable candidate. In PTP the time-stamp is divided into two sections corresponding to seconds and nanoseconds. The Timestamp type represents a positive time with respect to the epoch. Specifically:

```
struct Timestamp
{
  UInteger48 secondsField;
  UInteger32 nanosecondsField;
};
The secondsField member is the integer portion of the
timestamp in units of seconds.
The nanosecondsField member is the fractional portion of the
timestamp in units of nanoseconds.
The nanosecondsField member is always less than 10⁹.
```

The epoch is the origin of the agreed-upon timescale. IEEE 1588-2008 defines the PTP epoch as 1 Jan. 1970 00:00:00 TAI, which is 31 Dec. 1969 23:59:51.999918 UTC.

A full time-stamp therefore is represented using 10 octets though in practice, provided there is agreement between the two sides, a reduced size can be utilized. Here we assume that adequate bandwidth is allocated to accommodate the full time-stamp size.

Allocating 48 bits (6 octets) for the seconds field is solely to provide adequate dynamic range for delivering a time value that can include the full date (year/month/day) as well as the time-of-current-day in hours/minutes/seconds. Clearly, in normal operation the higher-order bits of the seconds field will not change that often. It is a simple matter then to utilize a reduced length, say 4 octets, for the seconds field for most transmissions and the full length at a much reduced rate. The higher-order bits of transmissions that use the reduced length for time value can be used to establish a communications channel between the two ends for carrying other information such as status and configuration. The nanoseconds field is 4 octets in length. Consequently, the time-stamp value is either a 10 octet entity (full time-stamp) or 8 octets (reduced length).

It is useful to assign a sequence number with the time-stamp that permits the recipient to align the time-stamp with the event (super-frame edge). One octet provides for a range of 0 through 255 and the sequence number rolls over from 255 to zero. It is useful to allocate one octet for a "label". This can be used to identify the time-stamp as being related to a time-of-departure of a sending-side super-frame event or time-of-arrival at the receiving side of a super-frame event. The label can also indicate whether the time-stamp is a full time-stamp (10 octets) or a reduced time-stamp (8 octets).

Figure 5:
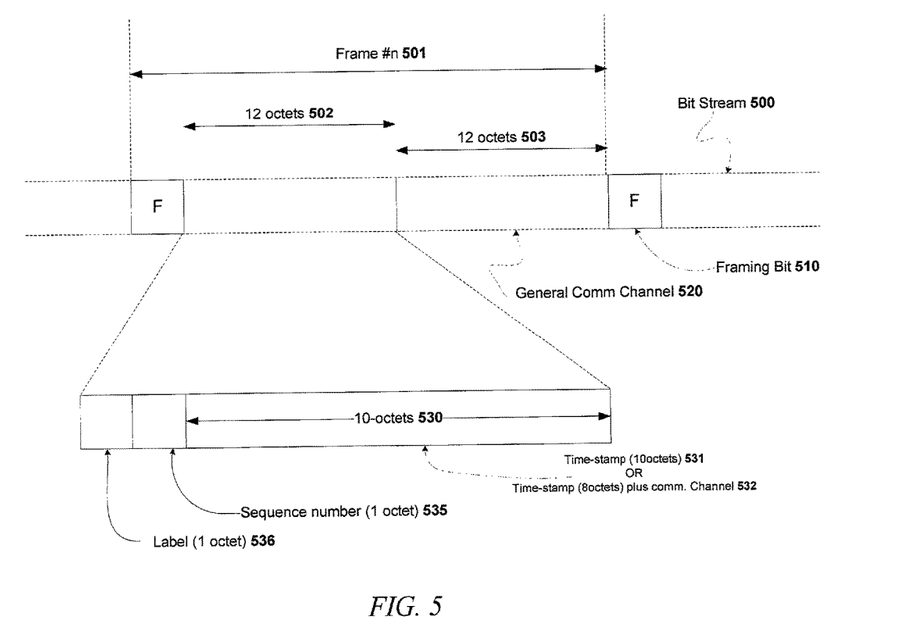
FIG. 5 depicts the bit allocation in each DS1 frame for time-stamps and communication channels.

One implementation of bandwidth assignment is depicted in FIG. 5. Considering that every DS1 frame has 192 bits (24 octets), a portion can be used for communication of time-stamps and control information between the master and slave clocks. The remainder is available for general usage. FIG. 5 shows 12 octets used by the clocks and 12 octets allocated for general usage. The general usage channel is thus a 768 kbps channel.

Figure 6:
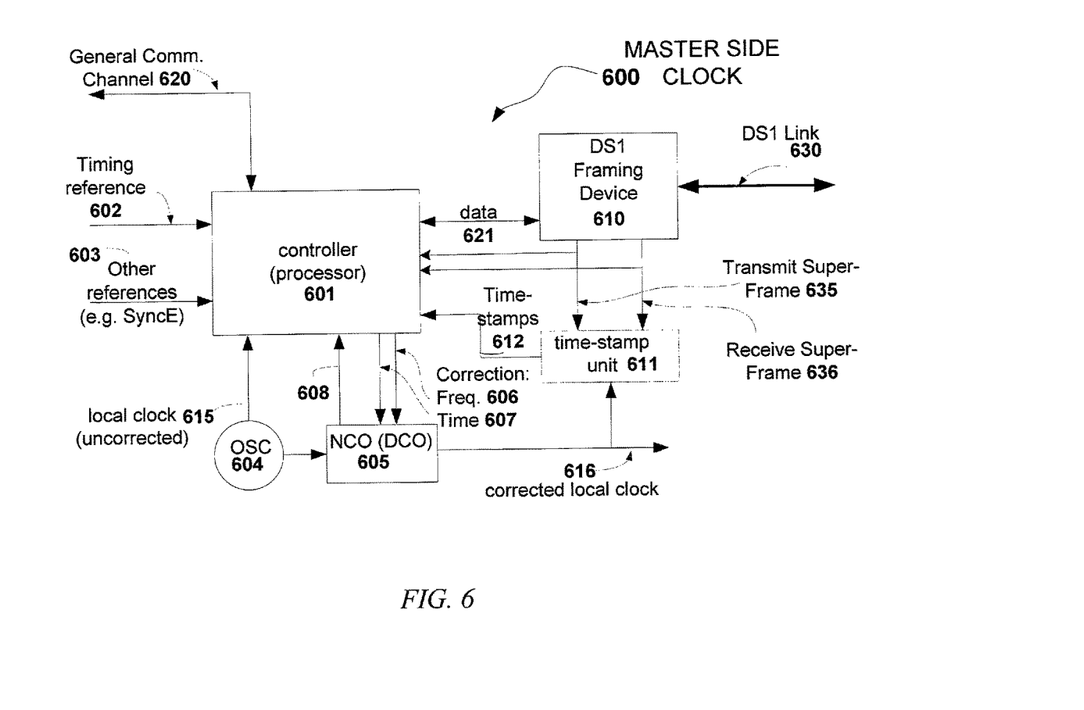
FIG. 6 illustrates the key features and functions of the Master side clock.

A simplified diagram of the clock subsystem for the master side (source of timing) is shown in FIG. 6 and a simplified diagram of the clock subsystem for the slave side (recipient of timing) is shown in FIG. 7. Note that there are many similarities and consequently it is likely that the same hardware can be optioned to achieve the two functions with most of the distinction being in the software. A brief description of the operation of the master and slave sides is provided next.

The clock on the master side 600 is generally aligned to a timing reference 602 and the alignment may be aided by additional references such as Synchronous Ethernet (SyncE) 603. The alignment process involves development of frequency correction 606 and time correction 607 applied to a numerically controlled oscillator (NCO) 605 (also referred to as a digitally controlled oscillator (DCO)). In the figure the arrangement assumes that the oscillator 604 is free-running and corrections are achieved using the NCO/DCO. Other arrangements are possible where the oscillator itself is controlled. The local (Master) clock is the corrected clock 616. A version of the corrected local clock is fed back to the controller/processor 601 to allow for comparison with the references. Based on the measured difference between the local corrected clock and the reference(s) the processor develops the correction terms 606 and 607, thereby implementing a closed loop.

The DS1 framing device 610 includes both the generation and extraction of framing as well as the signal conditioning for transmission and clock-and-data-recovery for reception. It is assumed that the DS1 framing device develops its autonomous super-frame timing as indicated by 635. This is fed to the time-stamp unit 611 and is available to the main controller/processor 601 as well. This ensures that the processor 601 is knowledgeable about the data being transmitted and can identify the 12 frames of the super-frame. This knowledge is important so that the processor can populate the data pathway 621 with the correct octets for the time-stamps and the correct octets corresponding to the general communication channel 620 in accordance with FIG. 5. The receive super-frame 636 enables the processor/controller to extract the received data and identify the constituent frames of the receive super-frame and thereby the time-stamps and the general communication channel.

The master side develops two time-stamps corresponding to the time-of-departure of the transmit super-frame as indicated by 635 and the time-of-arrival of the receive super-frame as indicated by 636. The master side maintains a counter to assign sequence numbers to the transmit super-frames; from the data available in the receive data stream, the master side is aware of the sequence number assigned to the super-frame by the other side as well as the sequence number and time-of-arrival of the super-frame previously transmitted by the master side.

The clock on the slave side 700 is generally aligned to a timing reference developed via time-stamps exchanged with the master side and may be aided by a reference (frequency) extracted from the DS1 link by the CDR 109. The alignment process involves development of frequency correction 706 and time correction 707 applied to a numerically controlled oscillator (NCO) 705 (also referred to as a digitally controlled oscillator (DCO)). In the figure the arrangement assumes that the oscillator 704 is free-running and corrections are achieved using the NCO/DCO. Other arrangements are possible where the oscillator itself is controlled. The local (Slave) clock is the corrected clock 716. A version of the corrected local clock is fed back to the controller/processor 701 to allow for comparison with the references. Based on the measured difference between the local corrected clock and the reference(s) developed from the time-stamp exchange with the master, the processor develops the correction terms 706 and 707, thereby implementing a closed loop. The reference developed from the time-stamps can be provided to other functions in the equipment as indicated by 702.

The DS1 framing device 710 includes both the generation and extraction of framing as well as the signal conditioning for transmission and clock-and-data-recovery for reception. It is assumed that the DS1 framing device develops its autonomous super-frame timing as indicated by 735. This is fed to the time-stamp unit 711 and is available to the main controller/processor 701 as well. This ensures that the processor 701 is knowledgeable about the data being transmitted and can identify the 12 frames of the super-frame. This knowledge is important so that the processor can populate the data pathway 721 with the correct octets for the time-stamps and the correct octets corresponding to the general communication channel 720 in accordance with FIG. 5. The receive super-frame 736 enables the processor/controller to extract the received data and identify the constituent frames of the receive super-frame and thereby the time-stamps and the general communication channel.

The slave side develops two time-stamps corresponding to the time-of-departure of the transmit super-frame as indicated by 735 and the time-of-arrival of the receive super-frame as indicated by 736. The slave side maintains a counter to assign sequence numbers to the transmit super-frames; from the data available in the receive data stream, the slave side is aware of the sequence number assigned to the super-frame by the other side as well as the sequence number and time-of-arrival of the super-frame previously transmitted by the slave side.

The first 12 octets of the frame are utilized for communication between the master and slave clocks on either side of the DS1 link and the second 12 octets are utilized for carrying the information related to the general communication channel. Alternatively, the second 12 octets of the frame are utilized for communication between the master and slave clocks on either side of the DS1 link and the first 12 octets are utilized for carrying the information related to the general communication channel. The 12 octets for the master-slave communication are depicted in FIG. 5.

Figure 8:
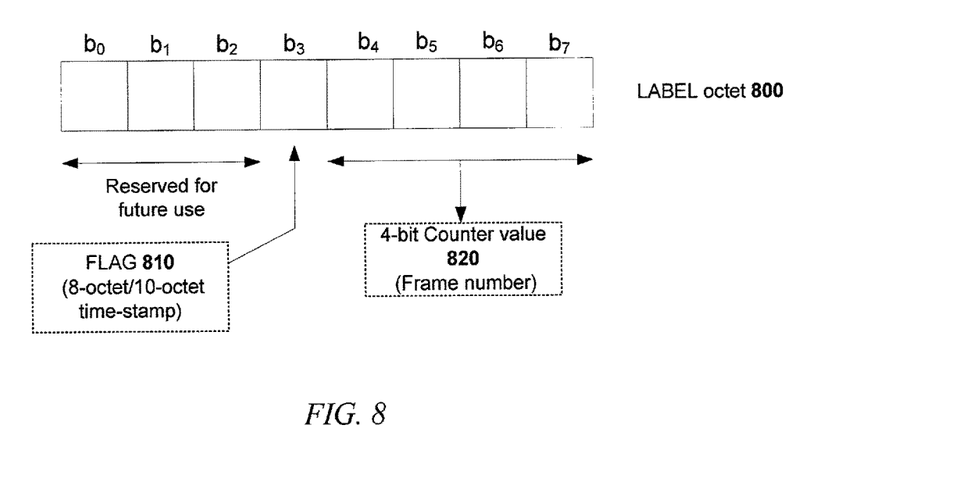
FIG. 8 describes the composition of the label octet.

A suitable utilization of the "label" octet is considered next. First, it is recommended that the label field include an indication of the frame number within the super-frame. Second, it is recommended that the label include the indication of which form of time-stamp is being used in that frame, namely either full time-stamp (10 octets) or reduced size time-stamp (8 octets) and in the latter case the implication is that there are 2 octets available for a communication channel between master and slave clocks for carrying control and/or status information. This is depicted in FIG. 8.

The frame number counter is a useful way to identify the time-stamp included in the frame. Since the super-frame includes 12 frames, the counter value cycles through 0, 1, 2, ..., 11. For identifying time-stamps, only two values are relevant because only two values necessarily need to be communicated for a super-frame to the other side. For specificity, assume that these two mandatory communications take place in Frame #0 and Frame #2.

In the master-to-slave direction, the time-stamp value contained in Frame #0 is the time-stamp struck by the master time-stamping unit 611 when a super-frame is received. The frame sequence number of the incoming time-stamped super-frame is available in Frame #2 of the incoming super-frame. The sequence number and time-stamp are transmitted together in Frame #0 of the earliest outgoing super-frame. Frame#2 of the incoming super-frame also contains the time-stamp of the incoming super-frame as struck by the slave side. This information is actually available at the slave side but, for convenience and monitoring purposes is advantageously transmitted in Frame #1 of the said earliest outgoing super-frame. Consequently, Frame #0 and Frame #1 of the outgoing super-frame both have identical sequence number entries and, respectively, the time-stamp of when the super-frame arrived at the master and the time-stamp of when the super-frame departed from the slave. Frame #0 of the incoming super-frame contains the sequence number of an earlier super-frame sent by the master as well as the time-stamp of when that super-frame arrived at the slave. The master returns this information in Frame #3 of the next transmitted super-frame at the earliest opportunity. Frame #2 of the outgoing super-frame includes the sequence number and the time-stamp struck by master time-stamping unit 611 of that same super-frame. Frame #4 through Frame #11 are available for other purposes.

The contents of the four frames (#0 through #3) of the outgoing super-frame from master-to-slave are depicted in Table 1, below. For convenience the letter "n" is used for sequence numbers of super-frames in the master-to-slave direction and "k" for super-frames in the slave-to-master direction. Usage of "$T_1$", "$T_2$", "$T_3$", and "$T_4$", follow FIG. 3 and are the time-stamps associated with time-of-departure from master, time-of-arrival at slave, time-of-departure from slave, and time-of-arrival at master, respectively.

TABLE 1

Contents of Frames #0 through #3 in master-to-slave direction indicating which time-stamp is included

| Frame # | Sequence index | Time-stamp |
|---|---|---|
| 0 | k | $T_4$ |
| 1 | k | $T_3$ |
| 2 | n | $T_1$ |
| 3 | (n-m) | $T_2$ |

Depending on the transmission delay and relative phasing of the super-frames in the two directions, the index of time-stamp $T_2$ could be 1 or 2 or 3 units behind that of the time-stamp $T_1$.

In the slave-to-master direction, the time-stamp value contained in Frame #0 is the time-stamp struck by the slave time-stamping unit 711 when a super-frame is received. The frame sequence number of the incoming time-stamped super-frame is available in Frame #2 of the incoming super-frame. The sequence number and time-stamp are transmitted together in Frame #0 of the earliest outgoing super-frame. Frame#2 of the incoming super-frame also contains the time-stamp of the incoming super-frame as struck by the master side. This information is actually available at the master side but, for convenience and monitoring purposes is advantageously transmitted in Frame #1 of the said earliest outgoing super-frame. Consequently, Frame #0 and Frame #1 of the outgoing super-frame both have identical sequence number entries and, respectively, the time-stamp of when the super-frame arrived at the slave and the time-stamp of when the super-frame departed from the master. Frame #0 of the incoming super-frame contains the sequence number of an earlier super-frame sent by the slave as well as the time-stamp of when that super-frame arrived at the master. The slave returns this information in Frame #3 of the next transmitted super-frame at the earliest opportunity. Frame #2 of the outgoing super-frame includes the sequence number and the time-stamp struck by slave time-stamping unit 711 of that same super-frame. Frame #4 through Frame #11 are available for other purposes.

The contents of the four frames (#0 through #3) of the outgoing super-frame from slave-to-master are depicted in Table 2, below. For convenience the letter "n" is used for sequence numbers of super-frames in the master-to-slave direction and "k" for super-frames in the slave-to-master direction. Usage of "$T_1$", "$T_2$", "$T_3$", and "$T_4$", follow FIG. 3 and are the time-stamps associated with time-of-departure from master, time-of-arrival at slave, time-of-departure from slave, and time-of-arrival at master, respectively.

TABLE 2

Contents of Frames #0 through #3 in the slave-to-master direction indicating which time-stamp is included

| Frame # | Sequence index | Time-stamp |
|---|---|---|
| 0 | n | $T_2$ |
| 1 | n | $T_1$ |
| 2 | k | $T_3$ |
| 3 | (k-m) | $T_4$ |

Depending on the transmission delay and relative phasing of the super-frames in the two directions, the index of time-stamp $T_4$ could be 1 or 2 or 3 units behind that of the time-stamp $T_3$.

The slave side develops a timing reference based on the communicated time-stamps in the two directions. The master side can also use the same information to verify that the slave is operating correctly. It is implicitly assumed that:

a. The transit delay from master-to-slave and from slave-to-master is equal (symmetric delay)
b. The transit delay in each direction is nominally constant.

The slave retains in memory the time-stamps associated with at least the N most recent super-frames for which the time-of-departure and time-of-arrival time-stamps are available. Based on this information a correction term is developed for the local (slave) clock. N is advantageously a large number but not so large that it represents a time interval beyond the stability profile of the oscillator. Whereas one method is described here, there are several other methods that can be employed to establish the clock corrections.

Denote by i an index that represents the iteration number. Each iteration represents N estimates of one-way delay from the time-stamps that are averaged to reduce measurement noise. Based on (Eq. 1), we can write:

$$\varepsilon_F(i) - \Delta_{MS} = -\frac{1}{N} \cdot \sum_{n=0}^{N-1} (T_2(n) - T_1(n)) \qquad \text{(Eq. 3A)}$$

$$\varepsilon_R(i) + \Delta_{SM} = \frac{1}{N} \cdot \sum_{k=0}^{N-1} (T_4(k) - T_3(k)) \qquad \text{(Eq. 3B)}$$

where the subscripts "F" and "R" represent "forward" and "reverse" directions, respectively. Assuming that the delay is symmetric (i.e. $\Delta_{MS}=\Delta_{SM}$), an estimate of clock error $\varepsilon(i)$ can be developed by combining the forward and reverse error estimates and then used in a clock correction algorithm (closed loop). Specifically, $$\varepsilon(i) = \frac{\varepsilon_F(i) + \varepsilon_R(i)}{2} = \qquad \text{(Eq. 3C)}$$

$$\frac{\frac{1}{N}\sum_{k=0}^{(N-1)}[T_4(k) - T_3(k)] - \frac{1}{N}\sum_{n=0}^{(N-1)}[T_2(n) - T_1(n)]}{2}$$

This estimate of time error is used in a conventional Proportional-Integral ("PI") phase-locked-loop arrangement to derive the clock corrections for frequency 706 and time 707 for the numerically controlled oscillator 705 (see FIG. 7). If the controlled oscillator is simply a voltage controlled oscillator (VCO) or digitally controlled oscillator (DCO) then clearly the corrections are combined to generate a single control variable.

An estimate of the frequency error of the local (slave) clock can be developed by considering the change in time error from iteration to iteration. Assuming that each iteration represents a time interval of T, and that these intervals are contiguous, frequency error estimates can be developed as:

$$\delta f_m(i) = \left(\frac{1}{mT}\right) \cdot (\varepsilon(i) - \varepsilon(i - m)) \qquad \text{(Eq. 4)}$$

In (Eq. 4) $\varepsilon(i)$ represents the time error estimate developed in the current interation (see Eq. 3C), labelled "i", and $\varepsilon(i-m)$ represents the time error estimate in interation "(i– m)" which is m iterations in the past. Note that the frequency error estimates can be developed over different observation time intervals of mT. This is a recommended approach to estimate frequency error because having multiple estimates over different observation intervals can provide a robust estimate by considering the average over multiple iterations. This frequency error estimate can be used to develop the correction term 706 (see FIG. 7).

The frequency error estimates can be developed even on one-way error estimates. In particular, we can rewrite (Eq. 4) as:

$$\delta f_m(i) = \left(\frac{1}{mT}\right) \cdot (\rho(i) - \rho(i-m)) \quad \text{(Eq. 5)}$$

Where the error estimate ρ(i) is given by one of the following:

$$\rho(i) = -\frac{1}{N} \cdot \sum_{n=0}^{N-1} (T_2(n) - T_1(n)) \quad \text{(Eq. 6A)}$$

$$\rho(i) = \frac{1}{N} \cdot \sum_{k=0}^{N-1} (T_4(k) - T_3(k)) \quad \text{(Eq. 6B)}$$

$$\rho(i) = \frac{\frac{1}{N}\sum_{k=0}^{(N-1)}[T_4(k) - T_3(k)] - \frac{1}{N}\sum_{n=0}^{(N-1)}[T_2(n) - T_1(n)]}{2} \quad \text{(Eq. 6C)}$$

Eq. 6A is representative of an error term developed using frames in the "forward" direction (from Master to Slave); Eq. 6B is representative of an error term developed using frames in the "reverse" direction (from Slave to Master) and Eq. 6C is equivalent to Eq. 3C and uses frames in both directions.

Definitions

The phrase first clock located at a receiving side is intended to mean a slave clock. The phrase second clock located at a sending side is intended to mean a master clock. The phrase radio relay link is intended to include millimeter wave as well as microwave. The terms program and software and/or the phrases program elements, computer program and computer software are intended to mean a sequence of instructions designed for execution on a computer system (e.g., a program and/or computer program, may include a subroutine, a function, a procedure, an object method, an object implementation, an executable application, an applet, a servlet, a source code, an object code, a shared library/dynamic load library and/or other sequence of instructions designed for execution on a computer or computer system).

The term uniformly is intended to mean unvarying or deviate very little from a given and/or expected value (e.g, within 10% of). The term substantially is intended to mean largely but not necessarily wholly that which is specified. The term approximately is intended to mean at least close to a given value (e.g., within 10% of). The term generally is intended to mean at least approaching a given state. The term coupled is intended to mean connected, although not necessarily directly, and not necessarily mechanically. The term proximate, as used herein, is intended to mean close, near adjacent and/or coincident; and includes spatial situations where specified functions and/or results (if any) can be carried out and/or achieved. The term distal, as used herein, is intended to mean far, away, spaced apart from and/or non-coincident, and includes spatial situation where specified functions and/or results (if any) can be carried out and/or achieved. The term deploying is intended to mean designing, building, shipping, installing and/or operating.

The terms first or one, and the phrases at least a first or at least one, are intended to mean the singular or the plural unless it is clear from the intrinsic text of this document that it is meant otherwise. The terms second or another, and the phrases at least a second or at least another, are intended to mean the singular or the plural unless it is clear from the intrinsic text of this document that it is meant otherwise. Unless expressly stated to the contrary in the intrinsic text of this document, the term or is intended to mean an inclusive or and not an exclusive or. Specifically, a condition A or B is satisfied by any one of the following: A is true (or present) and B is false (or not present), A is false (or not present) and B is true (or present), and both A and B are true (or present). The terms a and/or an are employed for grammatical style and merely for convenience.

The term plurality is intended to mean two or more than two. The term any is intended to mean all applicable members of a set or at least a subset of all applicable members of the set. The phrase any integer derivable therein is intended to mean an integer between the corresponding numbers recited in the specification. The phrase any range derivable therein is intended to mean any range within such corresponding numbers. The term means, when followed by the term "for" is intended to mean hardware, firmware and/or software for achieving a result. The term step, when followed by the term "for" is intended to mean a (sub) method, (sub)process and/or (sub)routine for achieving the recited result. Unless otherwise defined, all technical and scientific terms used herein have the same meaning as commonly understood by one of ordinary skill in the art to which this present disclosure belongs. In case of conflict, the present specification, including definitions, will control.

The described embodiments and examples are illustrative only and not intended to be limiting. Although embodiments of the present disclosure can be implemented separately, embodiments of the present disclosure may be integrated into the system(s) with which they are associated. All the embodiments of the present disclosure disclosed herein can be made and used without undue experimentation in light of the disclosure. Embodiments of the present disclosure are not limited by theoretical statements (if any) recited herein. The individual steps of embodiments of the present disclosure need not be performed in the disclosed manner, or combined in the disclosed sequences, but may be performed in any and all manner and/or combined in any and all sequences.

Various substitutions, modifications, additions and/or rearrangements of the features of embodiments of the present disclosure may be made without deviating from the scope of the underlying inventive concept. All the disclosed elements and features of each disclosed embodiment can be combined with, or substituted for, the disclosed elements and features of every other disclosed embodiment except where such elements or features are mutually exclusive. The scope of the underlying inventive concept as defined by the appended claims and their equivalents cover all such substitutions, modifications, additions and/or rearrangements.

The appended claims are not to be interpreted as including means-plus-function limitations, unless such a limitation is explicitly recited in a given claim using the phrase(s) "means for" or "mechanism for" or "step for". Sub-generic embodiments of this disclosure are delineated by the appended independent claims and their equivalents. Specific embodiments of this disclosure are differentiated by the appended dependent claims and their equivalents.

What is claimed is:

1. A method, comprising synchronizing a first clock located at a receiving side to a second clock located at a sending side including aligning the first clock to the second clock by adjusting the first clock using forward and reverse error estimates $\varepsilon_F(i)$ and $\varepsilon_R(i)$ where $$\varepsilon_F(i) - \Delta_{MS} = -\frac{1}{N} \cdot \sum_{n=0}^{N-1} (T_2(n) - T_1(n))$$

$$\varepsilon_R(i) + \Delta_{SM} = \frac{1}{N} \cdot \sum_{k=0}^{N-1} (T_4(k) - T_3(k))$$

where i is an index that represents an iteration number, each iteration representing N estimates of one-way delay from time-stamps that are averaged to reduce measurement noise, where $\Delta_{MS}$ is forward delay from the second clock to the first clock, where $\Delta_{SM}$ is reverse delay from the first clock to the second clock, where subscripts F and R represent forward and reverse directions, respectively, where $T_1$ is a first time of departure measured according to the second clock, where $T_2$ is a first time of arrival measured according to the first clock, where $T_3$ is a second time of departure measured according to the first clock and where $T_4$ is a second time of arrival measured according to the second clock.

2. The method of claim 1, wherein $\Delta_{MS} = \Delta_{SM}$ and an estimate of clock error $\varepsilon(i)$ is developed by combining forward and reverse error estimates as $$\varepsilon(i) = \frac{\varepsilon_F(i) + \varepsilon_R(i)}{2} = \frac{\frac{1}{N}\sum_{k=0}^{(N-1)}[T_4(k) - T_3(k)] - \frac{1}{N}\sum_{n=0}^{(N-1)}[T_2(n) - T_1(n)]}{2}.$$

3. The method of claim 2, wherein the estimate of clock error $\varepsilon(i)$ is used in a closed loop clock correction step.

4. The method of claim 3, further comprising delivering a timing reference over a dedicated framed digital channel.

5. The method of claim 4, further comprising building a distributed boundary clock.

6. The method of claim 5, further comprising deploying a radio relay link for backhaul of cellular traffic between base-stations and a wireless network, the radio link having a primary wide-band channel and a secondary narrow band channel that is used to transfer timing.

7. A non-transitory computer readable media, comprising computer or machine readable program elements translatable for implementing the method of claim 1.

* * * * *